United States Patent
Graham et al.

(10) Patent No.: US 8,648,999 B2
(45) Date of Patent: Feb. 11, 2014

(54) ALIGNMENT OF LIGHT SOURCE FOCUS

(75) Inventors: Matthew R. Graham, San Diego, CA (US); William N. Partlo, Poway, CA (US); Steven Chang, San Diego, CA (US); Robert A. Bergstedt, Carlsbad, CA (US)

(73) Assignee: Cymer, LLC, San Diego, CA (US)

( * ) Notice: Subject to any disclaimer, the term of this patent is extended or adjusted under 35 U.S.C. 154(b) by 424 days.

(21) Appl. No.: 12/841,728

(22) Filed: Jul. 22, 2010

(65) Prior Publication Data
US 2012/0019826 A1 Jan. 26, 2012

(51) Int. Cl.
*G01J 3/00* (2006.01)

(52) U.S. Cl.
USPC .......................................................... 356/51

(58) Field of Classification Search
USPC .......... 356/123, 400, 51, 399; 250/201.2–205
See application file for complete search history.

(56) References Cited

U.S. PATENT DOCUMENTS

| | | | |
|---|---|---|---|
| 4,695,158 A * | 9/1987 | Kotaka et al. ................. | 356/123 |
| 4,767,921 A | 8/1988 | Kawasaki et al. | |
| 6,167,018 A | 12/2000 | Morimoto et al. | |
| 7,453,077 B2 * | 11/2008 | Bowering et al. ......... | 250/504 R |
| 2004/0227922 A1 | 11/2004 | Dierichs et al. | |
| 2008/0087847 A1 | 4/2008 | Bykanov et al. | |
| 2009/0014668 A1 | 1/2009 | Vaschenko | |
| 2009/0046273 A1 * | 2/2009 | Bakshi et al. .................. | 356/51 |
| 2009/0267005 A1 | 10/2009 | Bykanov et al. | |
| 2010/0024980 A1 | 2/2010 | Ershov et al. | |
| 2010/0127191 A1 | 5/2010 | Partlo et al. | |
| 2010/0140512 A1 * | 6/2010 | Suganuma et al. ....... | 250/504 R |

OTHER PUBLICATIONS

Wei-Yao Hsu et al., "Development of the fast astigmatic auto-focus microscope system," Meas. Sci. Technol. 20 (2009) 045902, 9 pp.
Christopher C. Chrobak et al., "System, Method and Apparatus for Aligning and Synchronizing Target Material for Optimum Extreme Ultraviolet Light Output," U.S. Appl. No. 12/725,178, filed with the U.S. Patent & Trademark Office on Mar. 16, 2010, 52 pages.
Robert A. Bergstedt et al., "Beam Transport System for Extreme Ultraviolet Light Source," U.S. Appl. No. 12/638,092, filed with the U.S. Patent & Trademark Office on Dec. 15, 2009, 42 pages.
Lee W. Young of the International Searching Authority, Search Report mailed Nov. 17, 2011 for counterpart application PCT/US11/44058, 2 pages.
Lee W. Young of the International Searching Authority, Written Opinion mailed Nov. 17, 2011 for counterpart application PCT/US11/44058, 8 pages.

* cited by examiner

*Primary Examiner* — Gregory J Toatley
*Assistant Examiner* — Rufus Phillips
(74) *Attorney, Agent, or Firm* — DiBerardino McGovern IP Group LLC

(57) ABSTRACT

An extreme ultraviolet light system includes a steering system that steers and focuses an amplified light beam traveling along a propagation direction to a focal plane near a target location within an extreme ultraviolet light chamber, a detection system including at least one detector positioned to detect an image of a laser beam reflected from at least a portion of a target material within the chamber, a wavefront modification system in the path of the reflected laser beam and between the target location and the detection system, and a controller. The wavefront modification system is configured to modify the wavefront of the reflected laser beam as a function of a target focal plane position along the propagation direction. The controller includes logic for adjusting a location of the focal plane of the amplified light beam relative to the target material based on the detected image of the reflected laser beam.

29 Claims, 12 Drawing Sheets

ALIGNMENT OF LIGHT SOURCE FOCUS

TECHNICAL FIELD

The disclosed subject matter relates to automatic alignment of a focus of a light source with a target material in an extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser irradiating the target material in an LPP process. This may be especially true for certain target materials, for example, for materials containing tin. For example, one advantage is the ability to produce a relatively high conversion efficiency between the drive laser input power and the output EUV power.

SUMMARY

In some general aspects, an extreme ultraviolet light system includes a light source, a steering system, an extreme ultraviolet light chamber, a detection system, a wavefront modification system, and a controller coupled to the detection system and to the steering system. The light source produces an amplified light beam traveling along a propagation direction and the steering system steers and focuses the amplified light beam to a focal plane near a target location. The extreme ultraviolet light chamber includes an extreme ultraviolet light collector and a target material at the target location. The detection system includes at least one detector positioned to detect an image of a laser beam reflected from at least a portion of the target material. The wavefront modification system is in the path of the reflected laser beam and between the target location and the detection system and is configured to modify the wavefront of the reflected laser beam as a function of a target focal plane position along the propagation direction. The controller includes logic for adjusting a location of the focal plane of the amplified light beam relative to the target material along the propagation direction based on the detected image of the reflected laser beam.

Implementations can include one or more of the following features. For example, the wavefront modification system can include a transmissive optical element. The transmissive optical element can be an astigmatic lens or a cylindrical lens. The wavefront modification system can include a reflective optical element. The reflective optical element can include a cylindrical mirror or a saddle-shaped mirror.

A size and an orientation of the detected image of the reflected laser beam can vary with the target focal plane position relative to the target location.

The wavefront modification system can be between an output window of the light source and the detection system.

The wavefront modification system can be between the target location and an output window of the light source.

The reflected laser beam that is detected by the detection system can be the amplified light beam reflected from the target material. The target focal plane can be the focal plane of the amplified light beam. The system can also include a guide laser producing a guide laser beam aligned with the amplified light beam, where the guide laser beam operates at a wavelength that is distinct from a wavelength of the amplified light beam. The reflected laser beam that is detected by the detection system can be the guide laser beam reflected from the target material. The target focal plane can be a focal plane of the guide laser beam.

The light source can include at least a power amplifier. The light source can include at least a master oscillator.

In another general aspect, extreme ultraviolet light is generated by irradiating a target material with an amplified light beam traveling along a propagation direction at a focal plane of the amplified light beam; modifying a wavefront of a laser beam reflected from the target material, wherein the modification is a function of a position of a target focal plane along the propagation direction; detecting an image of the modified reflected laser beam; determining a location of the focal plane of the amplified light beam based on the detected image; adjusting the position of the focal plane relative to the target material if the determined focal plane location does not overlap a target location; and irradiating the target material with the amplified light beam having the adjusted focal plane position.

Implementations can include one or more of the following features. For example, the reflected laser beam can be the amplified light beam reflected from the target material. The target material can be irradiated with the amplified light beam by operating a light source to generate pulses of the amplified light beam.

The wavefront of the reflected laser beam can be modified by modifying the wavefront only while the pulses are generated.

The reflected laser beam can be a guide laser beam reflected from the target material.

The wavefront of the reflected laser beam can be modified by introducing a separation along the propagation direction between focal planes each having a focus in a respective transverse direction relative to the propagation direction.

The wavefront of the reflected laser beam can be modified by modifying one or more of a curvature and a shape of a wavefront of the reflected laser beam.

The wavefront of the reflected laser beam can be modified by introducing an astigmatism in the wavefront of the reflected laser beam.

The location of the focal plane can be determined by fitting the detected image to a metric and determining a center of image intensity and an orientation of the detected image based on the metric. The location of the focal plane can be determined by comparing the determined center of image intensity and the orientation to a predetermined set of centers of image intensity and orientations. The location of the focal plane can be determined by ascertaining whether a ratio between small and large moments of inertia of the image intensity is greater than a predetermined value; and ascertaining whether the orientation of the detected image is greater than a predetermined angle.

The location of the focal plane can be determined by fitting the detected image to the metric and determining an ellipticity based on the metric. The location of the focal plane can be determined by comparing characteristics of the determined ellipticity to a set of predetermined values.

DRAWING DESCRIPTION

DESCRIPTION

Figure 1:
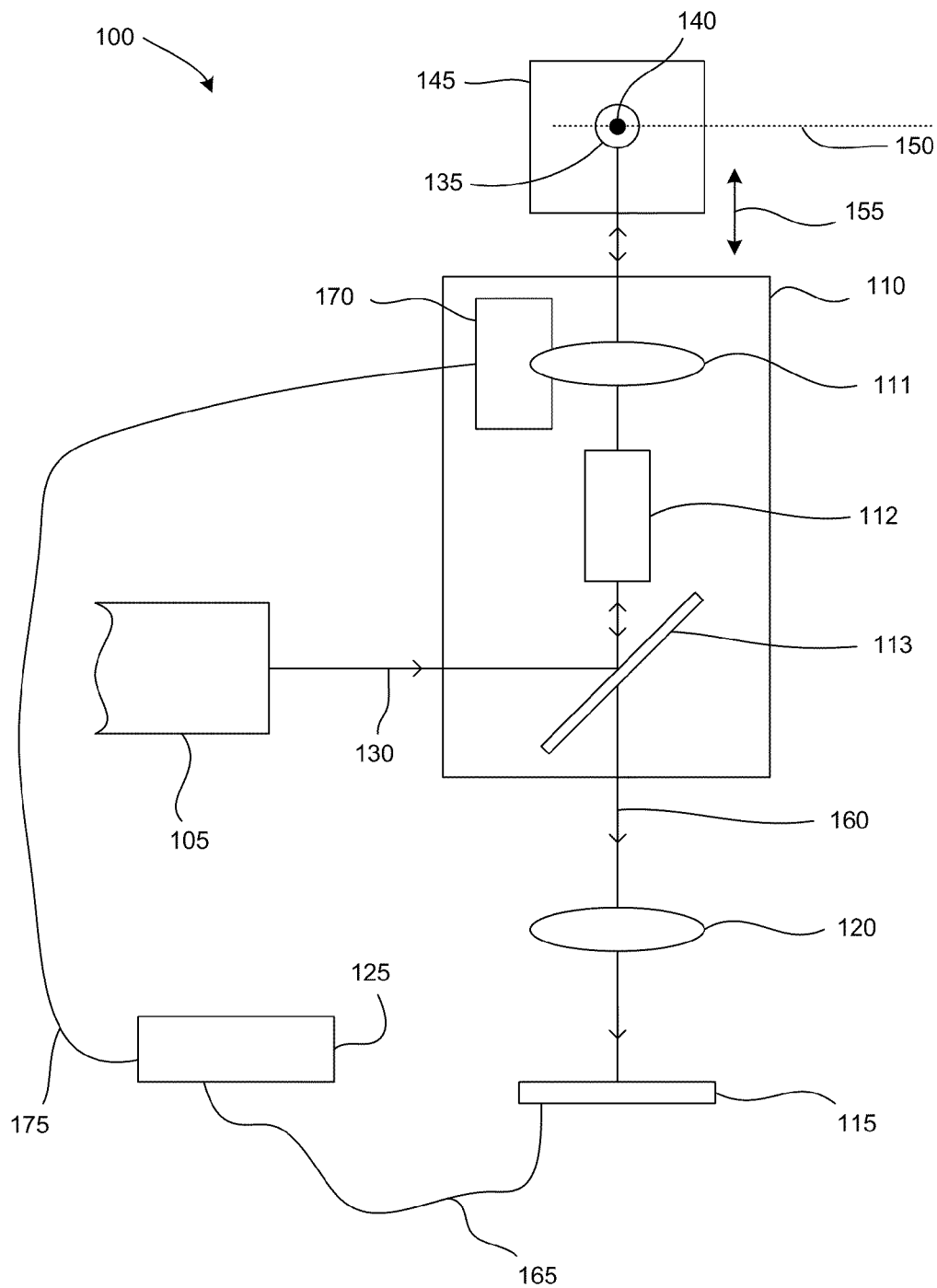
FIG. 1 is a block diagram of an alignment system for an LPP EUV light system.

Referring to FIG. 1, an extreme ultraviolet light system 100 includes, among other features, a light source 105, a steering system 110, a detection system 115, a wavefront modification system 120, and a controller 125. As discussed in detail below, an alignment system made up of the steering system 110, the detection system 115, the wavefront modification system 120, and the controller 125 automatically adjusts a focus of the light source 105 relative to a target material 140 within an extreme ultraviolet light chamber 145 while operating in a steady state. The precise location of the light source focus relative to the target material 140 is important since it determines the amount of energy imparted from the light source 105 to the target material 140 and therefore the amount of EUV light generated by the plasma.

The light source 105 produces an amplified light beam 130 traveling along a propagation direction. At the location of the target material 140, the propagation direction is represented by the arrow 155 in FIG. 1. The steering system 110 includes one or more components 111, 112, 113 that, for example, steer and focus the amplified light beam 130 to a focal region 135 near the target material 140 within the extreme ultraviolet light chamber 145. The focal region 135 is defined by a waist radius and a focal plane 150. The waist radius extends along the focal plane 150. The focal plane 150 is the plane that is perpendicular to the propagation direction 155 at which the waist radius of the light beam 130 is lowest. Therefore, the waist radius also extends in the plane perpendicular to the propagation direction 155. A description of the waist radius is found in "System, Method and Apparatus for Aligning and Synchronizing Target Material for Optimum Extreme Ultraviolet Light Output," U.S. application Ser. No. 12/725,178, filed on Mar. 16, 2010 (the '178 application), which is incorporated herein by reference in its entirety.

Figure 2:
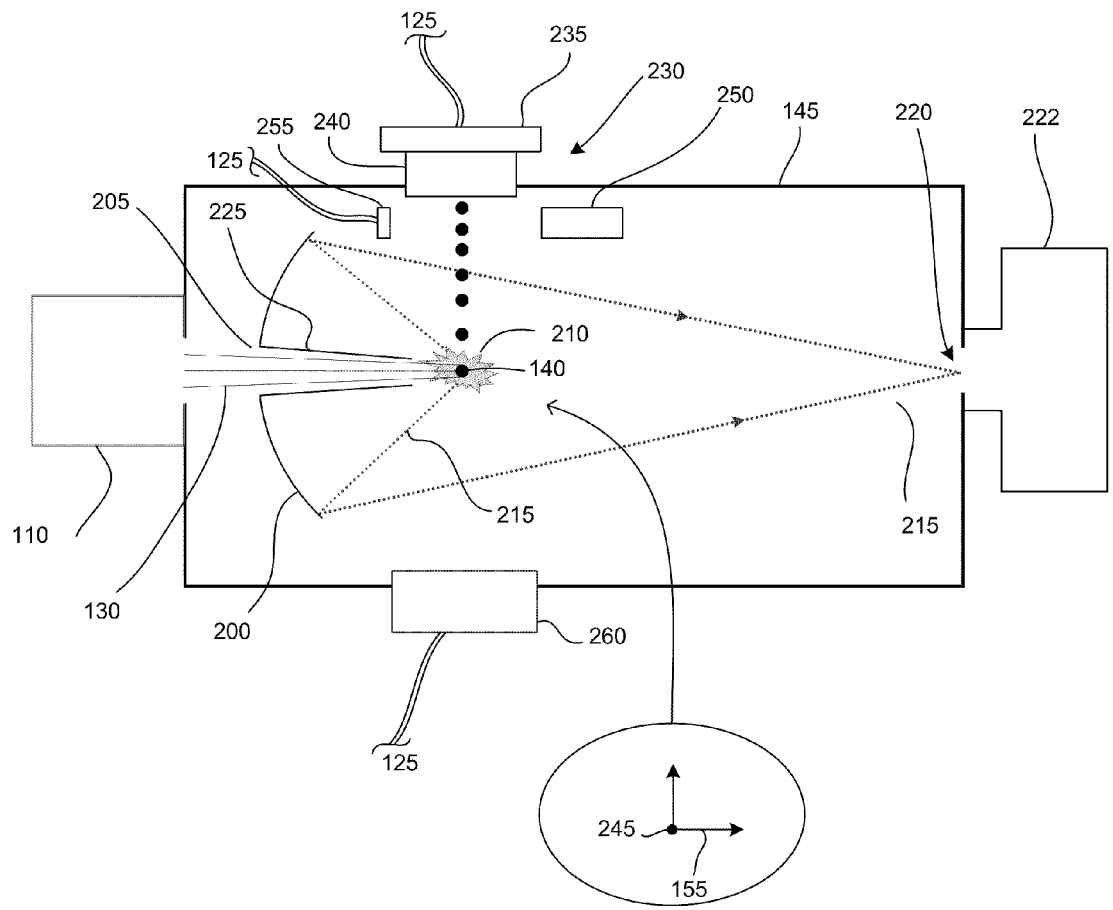
FIG. 2 is a block diagram of an extreme ultraviolet light chamber of the LPP EUV light system of FIG. 1.
Figure 3:
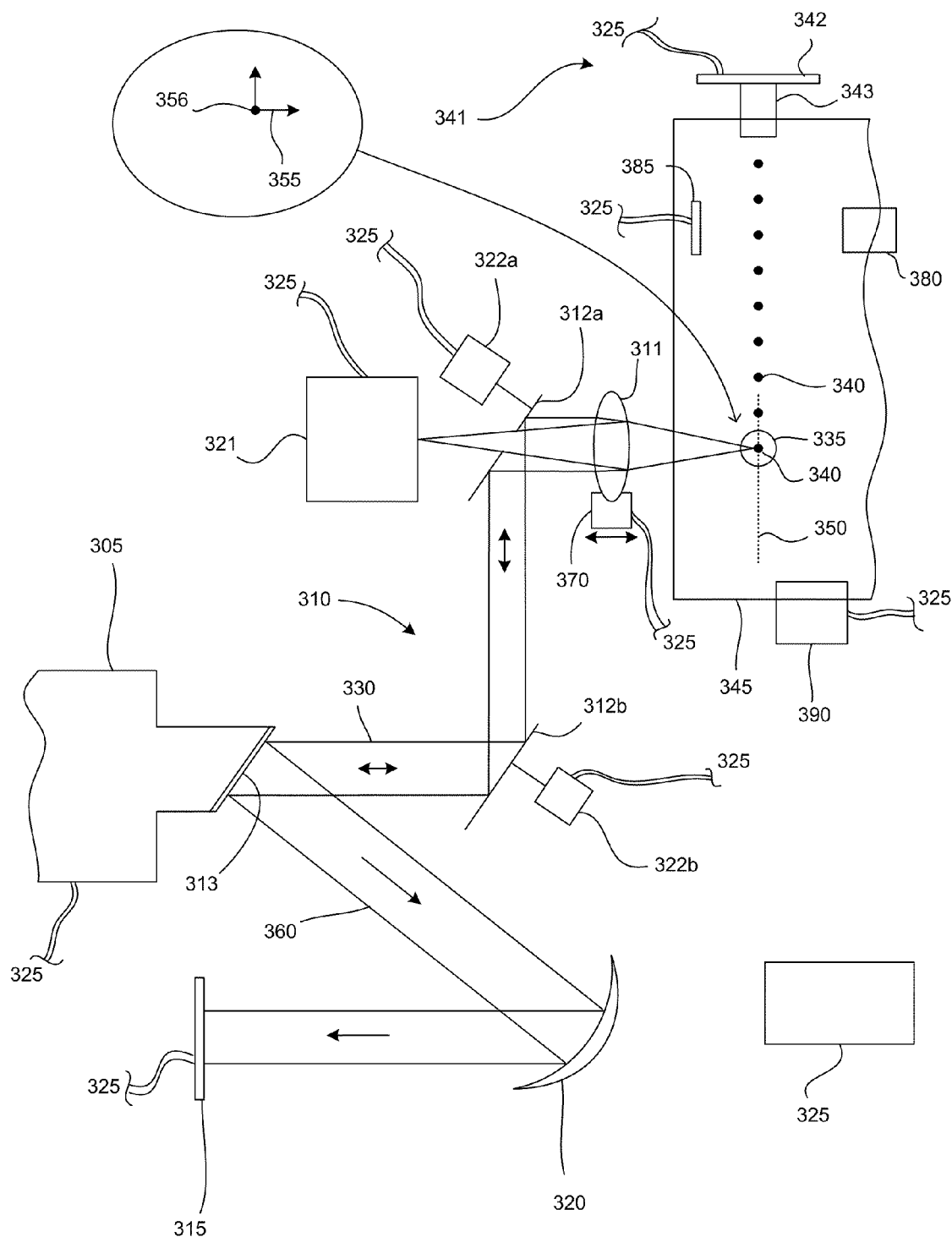
FIG. 3 is a block diagram of an exemplary implementation of the alignment system of FIG. 1.

The target material 140 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 140 can include a wire coated with one of the above elements, such as tin. If the target material is in a solid state, it can have any suitable shape, such as a ring, a sphere, or a cube. The target material 140 can be delivered by a target material delivery system (not shown in FIG. 1, but exemplary set ups are shown in FIGS. 2 and 3) into the interior of a chamber 145 and to the target location. The target location is also referred to as an irradiation site, the place where the target material 140 is irradiated by the amplified light beam 130 to produce plasma.

The component 113 is a device that is positioned to separate the amplified light beam 130 from a laser beam 160 that is reflected from at least a portion of the target material 140 and back through the steering system 110. The component 113 can be a partially transmissive mirror such as a beam splitter (as shown in FIG. 1), or it can be an output window of the light source 105 (as shown in FIG. 3). As a partially-transmissive mirror, the component 113 reflects the amplified light beam 130 toward the component 112 while enabling the reflected laser beam 160 to pass through toward the detector 115.

The component 112 can be a collection of optical elements (such as a beam transport system) that receives the amplified light beam 130 from the light source 105 and steers and modifies the amplified light beam 130 as needed toward the component 111. The component 112 can also include a beam expansion system that expands the amplified light beam. Description of an exemplary beam transport system and an exemplary beam expansion system can be found in "Beam Transport System for Extreme Ultraviolet Light Source," U.S. application Ser. No. 12/638,092, filed Dec. 15, 2009 (the '092 application), which is incorporated herein by reference in its entirety.

The component 111 includes a focusing optic such as a converging lens or a curved mirror that focuses the amplified light beam 130 to the focal plane 150. If the focusing optic is a curved mirror, then it can be made of a substrate having a coating that is highly reflective at the wavelength of the amplified light beam 130. For example, the mirror can have a maximum metal reflector (MMR) coating produced by II-VI Infrared of Saxonburg, Pa. over an oxygen-free high conductivity (OFHC) copper substrate. Other coatings that can be used for the mirror include gold and silver, and other substrates to which the coating can be applied include silicon, molybdenum, and aluminum. If the focusing optic is a converging lens, then it is made of a suitable material that can transmit at the wavelength of the amplified light beam 130. Exemplary focusing optics are described in the '092 application and the '178 application.

The detection system 115 includes at least one detector positioned to detect an image of the laser beam 160 that is reflected from at least a portion of the target material 140 and back through the steering system 110. The detection system 115 outputs the image signal to the controller 125, which performs an analysis of the image to determine how certain characteristics of the detected image vary with the focal plane position relative to the target material 140. The detection system 115 can be a pyroelectric solid state detector array such as the Pyrocam™ III Series from Ophir-Spiricon. In this particular implementation, the detection system 115 includes not only an imaging device (the solid state array camera) but also laser beam analysis software for other features and analysis capabilities.

As shown in FIG. 3, the laser beam 360 reflected from the target material 340 can be the amplified light beam 330 that is reflected from the target material 340. In this case, the focal plane 350 is the focal plane of the amplified light beam 330.

Figure 11:
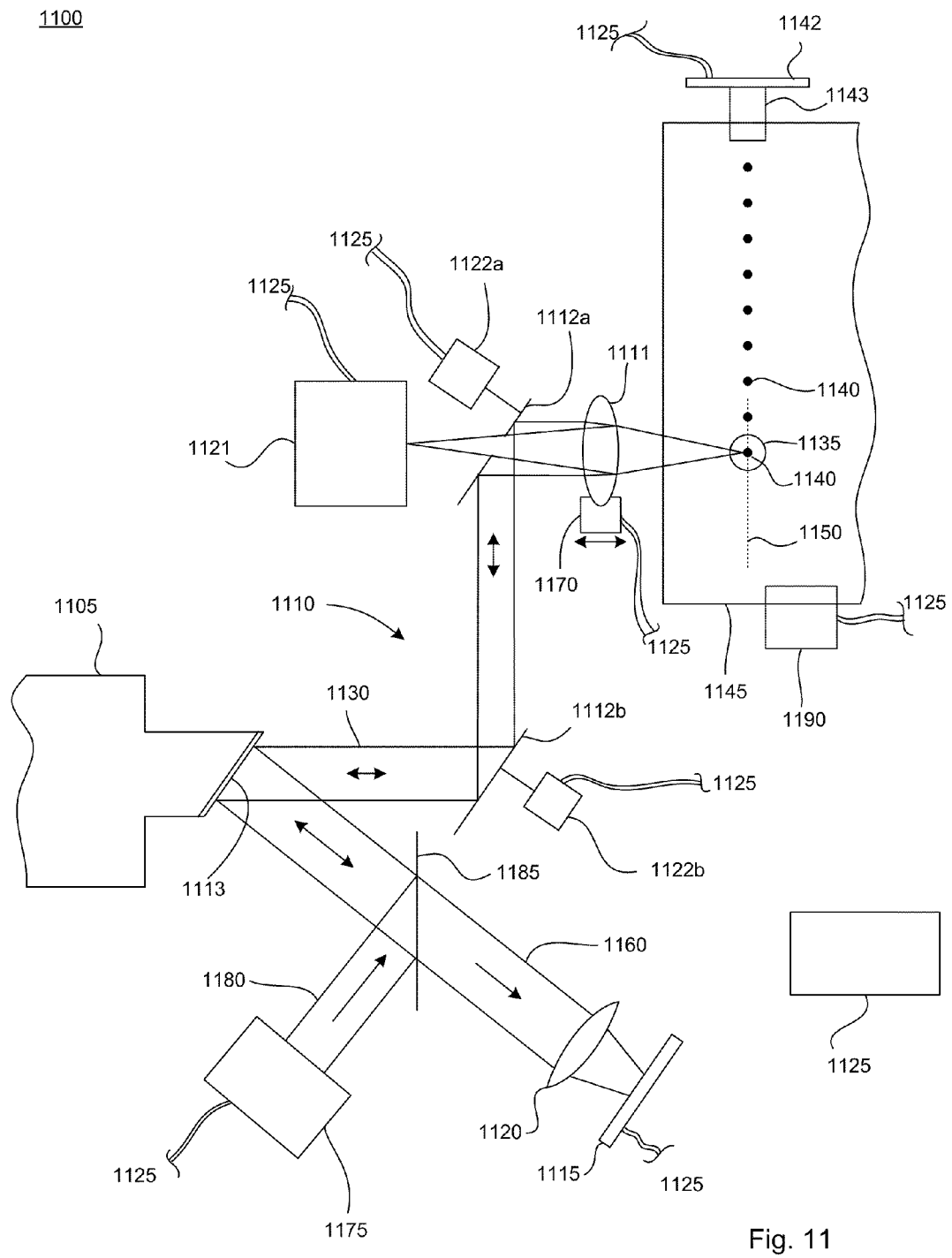
FIG. 11 is a block diagram of an exemplary implementation of the alignment system of FIG. 1.

In other implementations, such as that shown in FIG. 11, the laser beam 1160 reflected from the target material 1140 is a guide laser beam reflected from the target material 1140, where the guide laser beam is produced from a guide laser and is aligned with the amplified light beam 1130. In some implementations, the guide laser beam operates at a wavelength that is distinct from a wavelength of the amplified light beam 1130 while in other implementations, the guide laser beam operates at the same wavelength as the wavelength of the amplified light beam 1130. If the guide laser beam operates at the same wavelength as the wavelength of the amplified light beam 1130, then the focal plane 1150 is the focal plane of both the guide laser beam and the amplified light beam 1130. On the other hand, if the guide laser beam operates at a wavelength that is distinct from the wavelength of the amplified light beam 1130, then the focal plane of the guide laser beam may be slightly offset from the focal plane 1150 and a corrective optic can be inserted after the guide laser to adjust the focal plane of the guide laser beam to align with the focal plane 1150.

The wavefront modification system 120 is in the path of the reflected laser beam 160 and is between the target material 140 and the detection system 115. The wavefront modification system 120 is configured to modify the wavefront of the reflected laser beam 160 as a function of the position of the focal plane 150 along the propagation direction 155 at the target material 140. The wavefront modification system 120 can be a component that has the sole purpose of modifying the wavefront (and therefore is an add-on component to the system 100) or it can be a component with purposes other than modification, for example, steering that has been altered to also modify the wavefront.

For example, the wavefront modification system 120 can be an optical device, such as the focusing optic 111, within the steering system 110 that is used not only to focus the amplified light beam 130 to the focal plane 150 but also to modify the wavefront of the reflected beam 160. In some implementations, such as those discussed herein, the wavefront modification system 120 is an optical device that is external to the steering system 110 and therefore is not used to focus the amplified light beam 130 to the focal plane 150. In this case, and as shown in FIG. 1, the wavefront modification system 120 can be between an output window of the light source 105 and the detection system 115 to reduce as much as possible the potential negative impact on EUV production efficiency due to the inclusion of the wavefront modification system 120, as discussed in greater detail below.

In some implementations, the wavefront modification system 120 includes a transmissive optical element such as an astigmatic lens or a cylindrical lens, as shown in FIG. 1. A transmissive optical element of this shape can be made of a material that can transmit at the wavelength of the amplified light beam 130. For example, transmissive optical element can be made of ZnSe, which is a material that can be used for infrared applications. Other materials that can be used include, but aren't limited to gallium arsenide (GaAs) and diamond.

In other implementations, the wavefront modification system 120 includes a reflective optical element such as a cylindrical mirror or a biconic mirror, as shown in FIG. 3. A biconic mirror has a surface that is curved oppositely along two transverse directions and has a saddle or hyperbolic paraboloid shape. Such a biconic mirror would be convex along a first direction that is transverse to a normal taken at the center of the mirror and is concave along a second direction that is transverse to the normal and to the first direction. In some implementations, the reflective optical element is manufactured by applying relevant forces to one or more points along a front and/or back surface of a flat mirror to cause the flat mirror to curve in the manner needed (for example, to be convex in the first direction and concave or flat in the second direction). In other implementations, the reflective optical element is manufactured by grinding, polishing, or coating a flat mirror to obtain a biconic or cylindrical surface. Such a reflective optical element can be made of any substrate and coating that is suitable for reflecting the amplified light beam 130, for example, to reflect most light at the wavelength of the amplified light beam 130. In some implementations, the reflective optical element is made of a highly reflective coating such as maximum metal reflector (MMR) coating produced by II-VI Infrared of Saxonburg, Pa. over an oxygen-free high conductivity (OFHC) copper substrate. Other coatings that can be used include gold and silver, and other substrates to which the coating can be applied include silicon, molybdenum, and aluminum.

More generally, the wavefront modification system 120 modifies the wavefront of the reflected laser beam 160 in that it creates two slightly different focal planes for the two directions that are transverse to the propagation direction. Thus, the asymmetry of the image of the laser beam 160 reflected from the target material varies with the position of the focal plane relative to the target material along the propagation direction 155. This asymmetry can be used by the detection system 115 to determine the relative position between the focal plane and the target material.

The controller 125 is coupled to, among other features, the detection system 115 through a communication channel 165 and to one or more components (such as an actuator 170 that controls a position of the component 111) of the steering system 110 through one or more communication channels 175. The controller 125 is configured to control adjustment of a location of the focal plane 150 of the amplified light beam relative to the target material 140 along the propagation direction 155 (by sending a signal through the communication channel 175) based on the detected image or image data of the reflected laser beam 160 that is received from the detection system 115. The controller 125 can be a general purpose computer that includes software and memory, the software including logic (instructions) that cause one or more output devices connected to the controller 125 to perform certain functions.

The actuator 170 can be a piezoelectric actuator or a stepper motor controlled micrometer, or any other suitable type of actuator.

Referring to FIG. 2 (and as described in greater detail in the '178 application), the extreme ultraviolet light chamber 145 includes an extreme ultraviolet light collector 200 having a reflective surface and an aperture 205 that allows the amplified light beam 130 to pass through toward the target material 140 and irradiate the target material 140 at the target location to produce plasma 210. EUV light 215 emitted from the target material upon irradiation with the amplified light beam 130 is reflected from the collector 200 toward an intermediate focus 220. The collector 200 can be, for example, an ellipsoidal mirror that has a first focus at the target location and a second focus at the intermediate focus 220, where the EUV light 215 can be output from the light system 100 and can be input to a downstream device 222, such as, for example, an integrated circuit lithography tool. The chamber 145 can also include an open-ended, hollow conical shroud 225 (for example, a gas cone) that tapers toward the target location from the collector 200 to reduce the amount of plasma-generated debris that enters the steering system 110 while allowing the amplified light beam 130 to reach the target location. For this purpose, a gas flow can be provided in the shroud that is directed toward the target location.

The light system 100 also includes a target material delivery system 230 delivering the target material 140 in the form of liquid droplets, a liquid stream, solid particles or clusters, or solid particles contained within liquid droplets or solid particles contained within a liquid stream. The target material 140 can be delivered by the target material delivery system 230 into the interior of a chamber 145 and to the target location. The target material delivery system 230 includes an actuation system 235 that controls a position of a nozzle 240 along the propagation direction 155 (at the location of the target material 140) and along a direction 245 (out of the page) perpendicular to the propagation direction 155. The light system 100 can also include a second light source 250 that is directed toward the droplets and toward a detector 255. Additionally, the light system 100 can include a detector 260 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The detector 260 generates a feedback signal for use by the master controller 125. The feedback signal can be, for example, indicative of the errors in parameters such as the timing and focus of the amplified light beam pulses to properly intercept the droplets in the right place and time for effective and efficient EUV light production.

Referring to FIG. 3, another implementation of an exemplary extreme ultraviolet light system 300 is designed to include the basic elements that were described in the light system 100 shown in FIG. 1. Thus, the light system 300 also includes a light source 305, a steering system 310, a detection system 315, a wavefront modification system 320, and a controller 325.

The steering system 310 includes two or more components 312a, b that reflect the amplified light beam 330 output from the light source 305 toward the focusing optic 311, which in this case is a lens. The components 312a, b are controlled by respective actuators 322a, b that are electrically connected to the controller 325 through respective communication channels. The steering system 310 also includes an output window 313 of the light source 305; the output window 313 reflects the laser beam 360 toward the wavefront modification system 320 while permitting the amplified light beam 330 to freely pass (so that the amplified light beam 330 does not enter the wavefront modification system 320). The steering system 310 includes a sensor 321 that monitors a position of the focusing optic 311.

The light system 300 also includes a target material delivery system 341 that delivers the target material 340 into the interior of a chamber 345 and to the target location. The target material delivery system 341 includes an actuation system 342 that controls a position of a nozzle 343 along the propagation direction 355 (at the location of the target material 340) and along a direction 356 (out of the page) perpendicular to the propagation direction 355. The light system 300 can also include a second light source 380 that is directed toward the droplets and toward a detector 385. Additionally, the light system 300 can include a detector 390 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The detector 390 generates a feedback signal for use by the master controller 325. The feedback signal can be, for example, indicative of the errors in parameters such as the timing and focus of the amplified light beam pulses to properly intercept the target material in the right place and time for effective and efficient EUV light production.

The light source 105, 305 includes one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system produces the amplified light beam due to a population inversion in the gain medium or mediums of the laser amplifiers even if there is no laser cavity. Moreover, the laser system can produce the amplified light beam that is a coherent laser beam if there is a laser cavity to provide enough feedback to the laser system. The term "amplified light beam" encompasses one or more of: light from the laser system that is merely amplified but not necessarily a coherent laser oscillation and light from the laser system that is amplified and is also a coherent laser oscillation.

The optical amplifiers in the laser system can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the laser system can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system can also include a cooling system such as water that can be used when operating the laser system at higher powers.

Figure 4A:
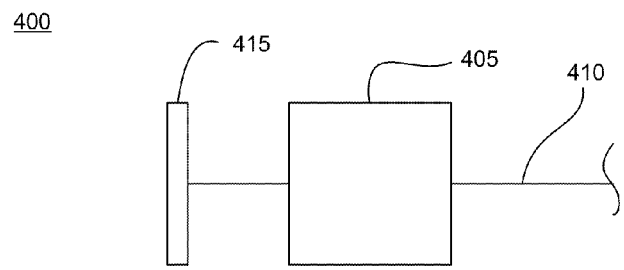
FIGS. 4A-4C are block diagrams of exemplary light sources that can be used in the alignment system of FIG. 1.

Referring also to FIG. 4A, in some implementations, the drive laser system can be configured as a so-called "self-targeting" laser system 400 in which the target material 140, 340 serves as one mirror of the optical cavity. In some "self-targeting" arrangements, a master oscillator may not be required. The laser system 400 includes at least one optical amplifier 405, which can have its own gain medium and excitation source, for example, pumping electrodes. The optical amplifier has a chamber that can be an RF pumped, fast axial flow, $CO_2$ amplifier chamber having a combined one pass gain of, for example, $10^3$-$10^6$ for amplifying light of a wavelength $\lambda$ of, for example, 10600 nm. The amplifier chamber can be designed without laser cavity (resonator) mirrors so that when set up alone it does not include the optical components needed to pass the amplified light beam 410 through the gain medium more than once. Nevertheless, as mentioned above, a laser cavity can be formed as follows.

In this implementation, a laser cavity can be formed by adding a rear partially reflecting optic 415 to the laser system 400 and placing the target material 140, 340 at the target location. The optic 415 can be, for example, a flat mirror, a curved mirror, a phase-conjugate mirror, or a corner reflector having a reflectivity of greater than about 90% for wavelengths of about 10600 nm (the wavelength of the amplified light beam 130, 330 if $CO_2$ amplifier chambers are used). The target material 140, 340 and the rear partially reflecting optic 415 act to reflect some of the amplified light beam 410 back into the laser system 400 to form the laser cavity. Thus, the presence of the target material 140, 340 at the target location provides enough feedback to cause the laser system 400 to produce coherent laser oscillation and in this case, the amplified light beam 410 can be considered a laser beam. When the target material 140, 340 isn't present at the target location, the laser system 400 may still be pumped to produce the amplified light beam 410 but it would not produce a coherent laser oscillation unless some other component within the laser system 400 provides enough feedback. In particular, during the intersection of the amplified light beam 410 with the target material 140, 340, the target material 140, 340 may reflect light along the beam path, cooperating with the optic 415 to establish an optical cavity passing through the optical amplifier 405. The arrangement is configured so the reflectivity of the target material 140, 340 is sufficient to cause optical gains to exceed optical losses in the cavity (formed from the optic 415 and the droplet) when the gain medium within the optical amplifier 405 is excited generating a laser beam for irradiating the target material 140, 340, creating a plasma, and producing an EUV light emission within the chamber 145, 345. With this arrangement, the optic 415, the optical amplifier 405, and the target material 140, 340 combine to form a so-called "self-targeting" laser system in which the target material 140, 340 serves as one mirror (a so-called plasma mirror or mechanical q-switch) of the optical cavity. Self-targeting laser systems are disclosed in "Drive Laser Delivery Systems for EUV Light Source," U.S. application Ser. No. 11/580,414, filed on Oct. 13, 2006 (the '414 application), the entire contents of which are hereby incorporated by reference herein.

In other implementations, the laser system 400 includes a chain of optical amplifiers (such as that shown in FIG. 4C), arranged in series along the beam path.

Figure 4B:
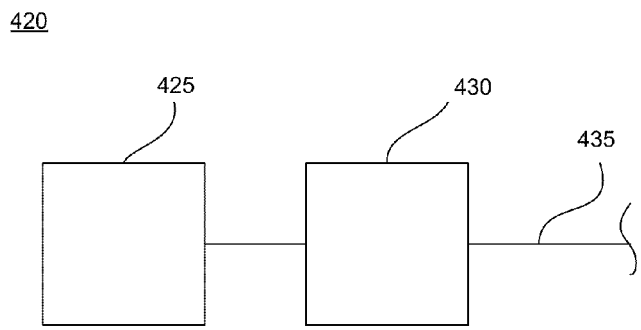

Referring to FIG. 4B, in another particular implementation, the drive laser system 420 has a master oscillator/power amplifier (MOPA) configuration having a seed pulse that is initiated by a master oscillator 425 and is fed into a single stage optical amplifier 430. The optical amplifier 430 can amplify the pulse output from the master oscillator 425, for example, using an RF pumped, fast axial flow, $CO_2$ amplifier to produce an amplified light beam 435 traveling along a beam path.

Figure 4C:
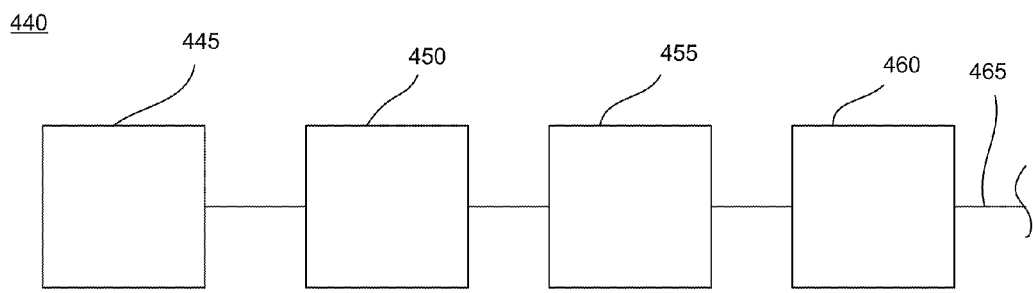

Referring also to FIG. 4C, in another implementation of a MOPA configuration, the drive laser system 440 includes a master oscillator 445 that feeds a set of optical amplifiers 450, 455, 460 to produce an amplified light beam 465 traveling along a beam path. In some implementations, each of the optical amplifiers 450, 455, 460 can be an RF pumped axial flow $CO_2$ laser cube having a 10 meter amplifier length that is folded by internal mirrors. Though not shown, it is possible that less or more than three optical amplifiers could be used in this implementation.

Depending on the application, other types of amplifiers or lasers can also be suitable, for example, an excimer or molecular fluorine laser operating at high power and high pulse repetition rate. Examples include a solid state laser, for example, having a fiber or disk shaped gain medium, a MOPA configured excimer laser system, as shown, for example, in U.S. Pat. Nos. 6,625,191; 6,549,551; and 6,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; or a solid state laser that seeds one or more excimer or molecular fluorine amplifier or oscillator chambers, may be suitable. Other designs are possible.

Figure 5:
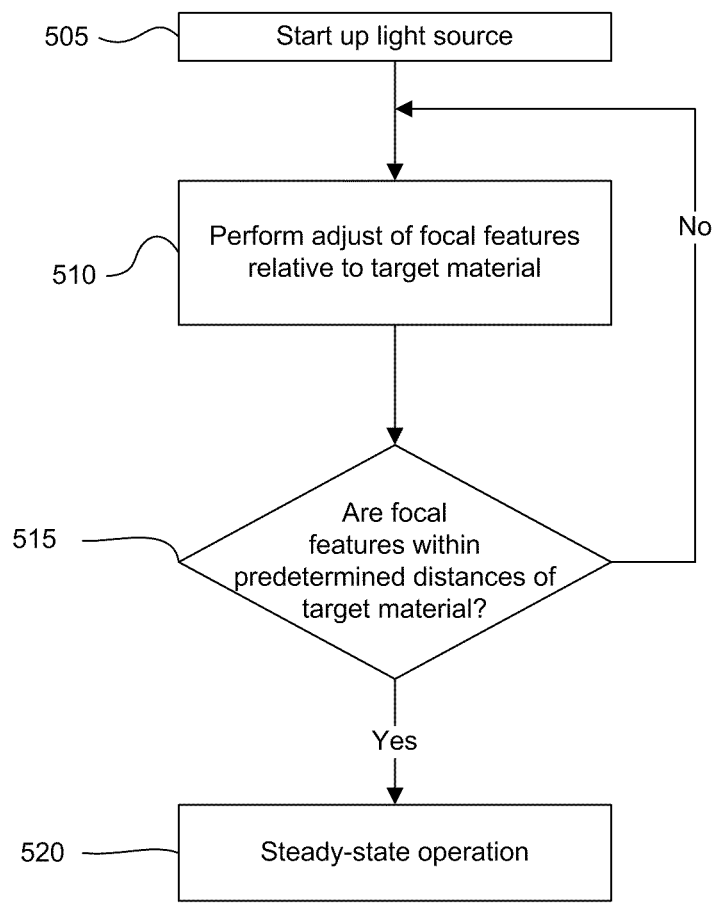
FIG. 5 is a flow chart of a procedure performed by the LPP EUV light system of FIG. 1.

Referring to FIG. 5, a procedure 500 is performed to operate the light system 100 or 300. Initially, the light system 100, 300 is powered up (step 505) and an initial alignment of the amplified light beam 130, 330 is performed (step 510). The initial alignment involves adjusting features of the light source 105, 305 and the steering system 110, 310 so that the amplified light beam 130, 330 enters the chamber 145, 345 and is generally directed toward the target location. In particular, the alignment includes determining whether the focal region 135, 335 (the waist which is in the focal plane 150, 350 and the focal plane 150, 350) is within a predetermined distance of the target material 140, 340 (step 515). Features that can be adjusted during this initial alignment include adjusting positions and angles of components within the steering system 110, 310 such as, for example, the component 112, 312a, b, the component 113, 313, and the focusing optic 111, 311. If the focal region 135, 335 is not within the predetermined distance of the target material 140, 340 then the features of the light source 105, 305 and the steering system 110, 310 are again adjusted (step 510). Adjustment can include adjusting features of the light source (such as adjusting the positions and angles of the components) to move the focal region 135, 335 along the propagation direction 155, 355 and along directions that are perpendicular to the propagation direction 155, 355 until a measured power of the EUV light 215 reaches a maximum value or until it exceeds a predetermined threshold. Adjustment can include alternatively or additionally include adjusting a position of the target material 140, 340 along one or more of the directions 355 and 356 until a measured power of the EUV light 215 reaches a maximum value or until it exceeds a predetermined threshold. If the focal region 135, 335 is within the predetermined distance of the target material 140, 340, then the light system 100, 300 enters steady-state operation (step 520).

Figure 6:
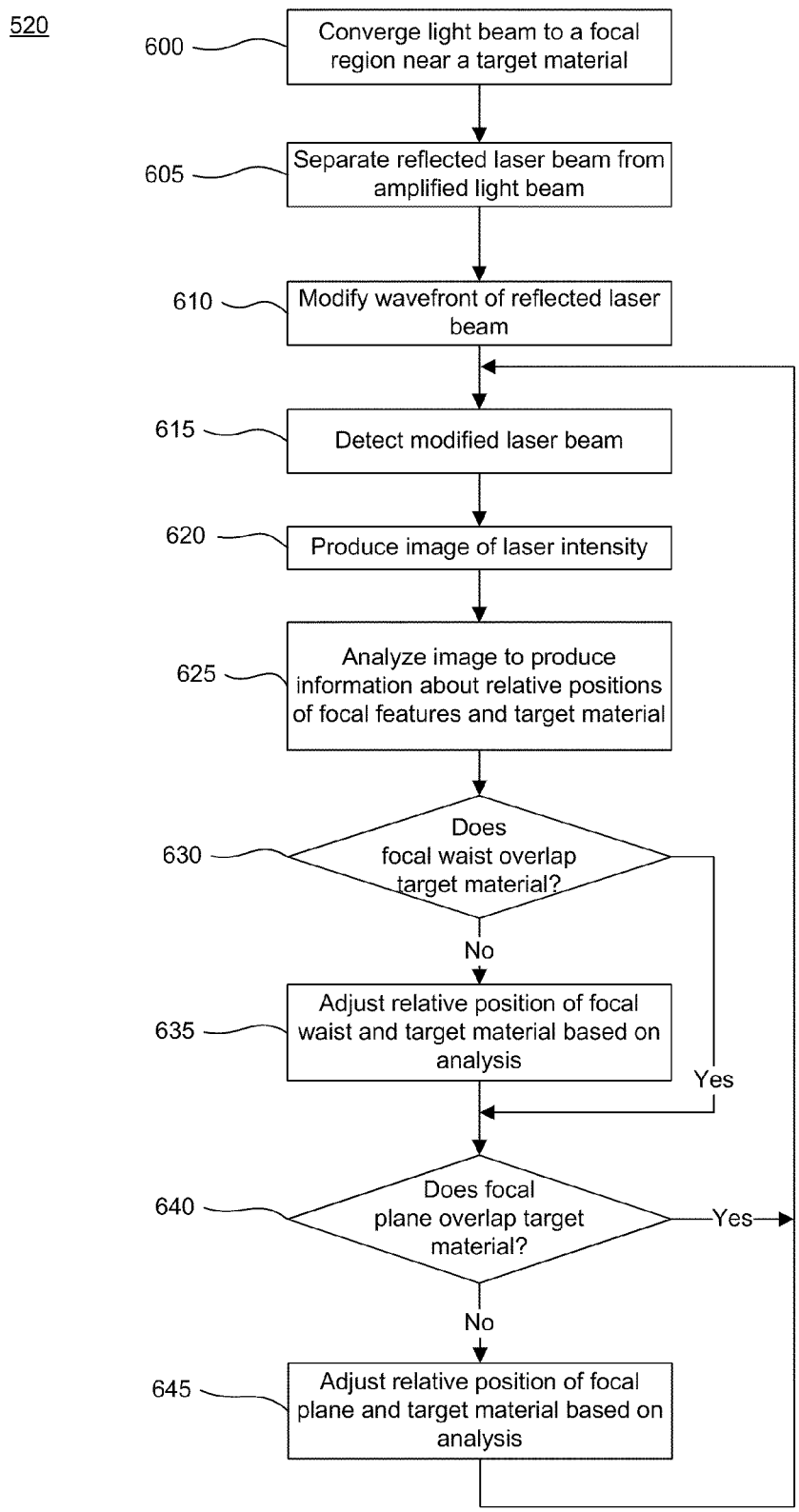
FIG. 6 is a flow chart of a procedure performed by the LPP EUV light system of FIG. 1.

Referring to FIG. 6, during steady-state operation 420, a procedure is performed by the light system 100, 300. Reference will be made to the generalized optical diagrams shown in FIGS. 7A-7C, which depict an amplified light beam 730 traveling along a propagation direction 755 and a reflected laser beam 760 that can be directed through the light systems 100, 300. In these optical diagrams, the detection system 115, 315 is depicted by reference 715, the wavefront modification system 120, 320 is depicted by reference 720, and the focusing optic 111, 311 is depicted by reference 711. Any steps described with reference to the elements shown in FIGS. 7A-7C would also apply to the corresponding elements shown in FIGS. 1 and 3.

Figure 7A:
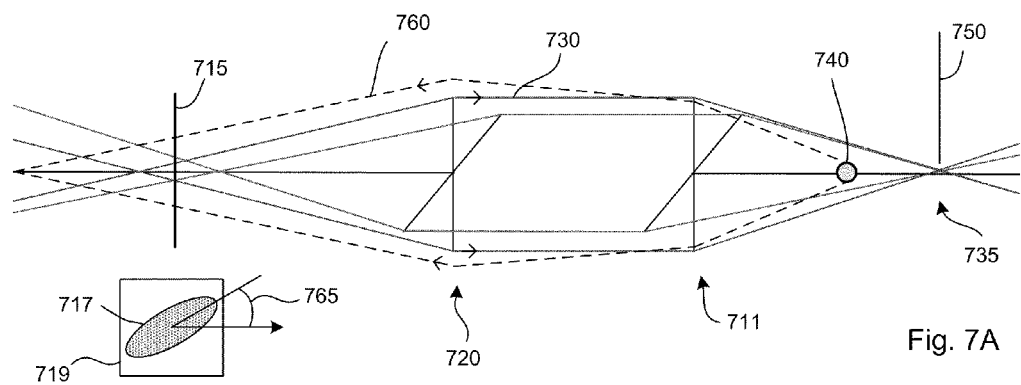
FIGS. 7A-7C are optical diagrams depicting an amplified light beam traveling through the alignment system of FIG. 1 or 3.

In FIG. 7A, the amplified light beam 730 is converged to a focal region 735 that is beyond or behind the target material 740. Therefore, the target material 740 does not overlap and is not inside the waist of the focal plane 750.

Figure 7B:
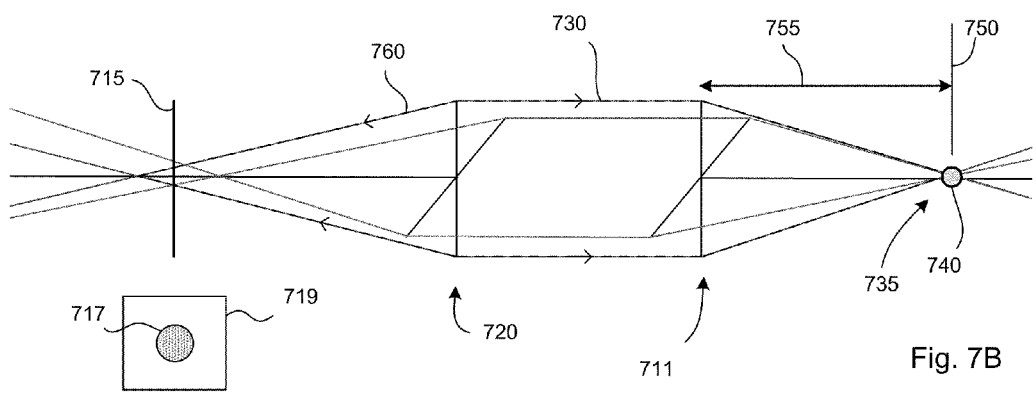

In FIG. 7B, the amplified light beam 730 is converged to a focal region 735 that is near to and overlaps with the target material 740. This means that the target material 740 is inside the waist and also overlaps the focal plane 750. The target material 740 overlaps the focal plane 750 if the target material

740 is within a predetermined distance (for example, within about 100 μm along the propagation direction 755) from the focal plane 750. This predetermined distance depends on the numerical aperture of the focusing optic 711 in that the larger the numerical aperture of the focusing optic 711 the smaller the predetermined distance.

Figure 7C:
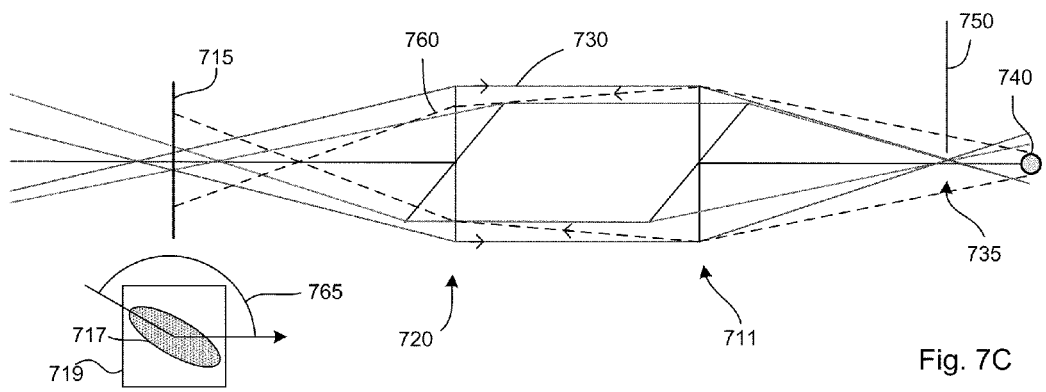

In FIG. 7C, the amplified light beam 730 is converged to a focal region 735 that is in front of the target material 740. Therefore, the target material 740 does not overlap and is not inside the waist of the focal plane 750.

The amplified light beam 730 is converged to the focal region 735 that is near to the target material 740 (step 600). In this initial step, it is possible that the focal region 735 does not technically overlap (as defined above) the target material 740, but that it is near enough that the steady-state procedure 520 can be started. The location of the focal region 735 is adjusted to overlap with the target material 740 during steady-state operation (step 520) by, among other things, analyzing the image output from the detection system 715, as discussed below.

The laser beam 760 that is reflected from the target material 740 is separated from the amplified light beam 730 using, for example, the components 113 or the output window 313 (step 605) (not shown in FIGS. 7A-7C for clarity) and the separated-out laser beam 760 is directed through the wavefront modification system 720 and toward the detection system 715. For example, in FIG. 1, the laser beam 160 passes through the partially-transmissive mirror 113 toward the detection system 115, while the amplified light beam 130 is reflected by the component 113. As another example, in FIG. 3, the laser beam 360 is reflected from the window 313 toward the wavefront modification system 320 while the amplified light beam 330 is directed through the window toward the steering system 310.

A wavefront of the laser beam 760 is modified by the wavefront modification system 720 (step 610). Thus, if the wavefront modification system 720 is an astigmatic lens (such as the lens 120 shown in FIG. 1) or a biconic mirror (such as the reflective optical element 320 shown in FIG. 3), then two slightly different focal planes are created for the two directions that are transverse to the propagation direction (generally labeled as the direction 755) of the laser beam 760. Thus, the wavefront modification system 720 introduces a defocus in the laser beam 760.

The amount of defocus introduced into the laser beam 760 depends on the amount of curvature in each of the axes or the difference in curvature between the two axes of the wavefront modification system 120, 320. Moreover, because the wavefront modification system 120, 320 distorts the wavefront by causing a defocus in the image of the target material, the resolution of the image obtained by the detection system 115, 315 drops as the defocus is increased because less light is used to obtain image contrast and the signal-to-noise ratio is reduced. Therefore, the amount of wavefront modification imparted by the system 120, 320 needs to be balanced against the need for enough image contrast to enable a determination about the position of the focal plane. In some implementations, the wavefront modification system 120, 320 has a radius of curvature along at least one of its axes of between about 10-100 meters, for example. The value of the acceptable ranges of the radius of curvature depends at least in part on the wavelength of the reflected laser beam 160, 360, the resolution of the detection system 115, 315, and the quality and design of the optical components through which the reflected laser beam travels.

The laser beam 760 that has been modified by the wavefront modification system 720 is detected at the detection system 715 (step 615). The light of the laser beam 760 generates an intensity profile at the detection system 715; the intensity profile indicates the position of the target material 740 relative to the focal region 735 of the amplified light beam 130. The detection system 715 generates an image 717 of this intensity profile on its display 719 (step 620) and the image 717 can be a two dimensional array of pixel intensities.

The controller 125, 325 receives the output of the detection system 115, 315 (or 715) and analyzes the output to produce information about the relative position between the focal region 735 and the target material 740 (step 625). Details about the analysis (step 625) are discussed with reference to FIG. 8. Next, the controller 125, 325 determines whether the focal waist overlaps the target material 740 (step 630) by, for example, analyzing a centroid that is calculated during the analysis (step 625). The analysis of the centroid to determine whether the focal waist overlaps the target material 740 is described in greater detail in the '178 application. Basically, the controller 125, 325 determines how far the centroid is (along the plane that extends perpendicular) from the center of the image, where the center of the image represents the optical axis (which is parallel with the propagation direction) of the amplified light beam 730. Next, if it is determined that the focal waist does not overlap the target material 740 along the plane that extends perpendicular from the optical axis (step 630), then the controller 125, 325 sends a signal to one or more actuators within the steering system 110, 310 to adjust positions and/or angles of components within the steering system 110, 310 to thereby adjust the relative position of the focal waist and target material 740 based on the location of the centroid (step 635). This adjustment is also described in greater detail in the '178 application.

It is possible that the controller 125, 325 makes the determination about whether the focal waist overlaps the target material 740 by considering measured characteristics of the plasma, for example, by considering a measured plasma position that can be determined from a separate camera within the chamber 145, 345. Such information about plasma position can be used to determine a position along at least one of the axes that are transverse to the propagation direction at the target material.

The controller 125, 325 also determines whether the focal plane overlaps the target material along the optical axis (step 640) based on the results of the analysis performed at step 625. If the analysis at step 625 indicates that the focal plane 750 does not overlap the target material 740 (for example, as shown in FIG. 7A or 7C), then the controller 125, 325 sends a signal to one or more actuators within the steering system 110, 310 to adjust positions and/or angles of components within the steering system 110, 310 to thereby adjust the relative position between the focal plane 750 and the target material 740 (step 645).

The detection system 115, 315 captures data at steps 615 and 620. The detection system 115, 315 captures the data periodically, and for a predetermined period of time, depending on the speed of the system 115, 315, with these periods of data-taking time interspersed with no data taking periods. The adjustments at steps 635 and 645 may be performed after one cycle of data taking (where a cycle is a period of data-taking time plus a period of no data taking) However, it may be more practical to perform the adjustments at steps 635, 645 after a plurality of cycles of data collection and averaging measurements enabling the light system 100, 300 to self correct and avoiding moving elements within the steering systems 110, 310 too rapidly.

Figure 8:
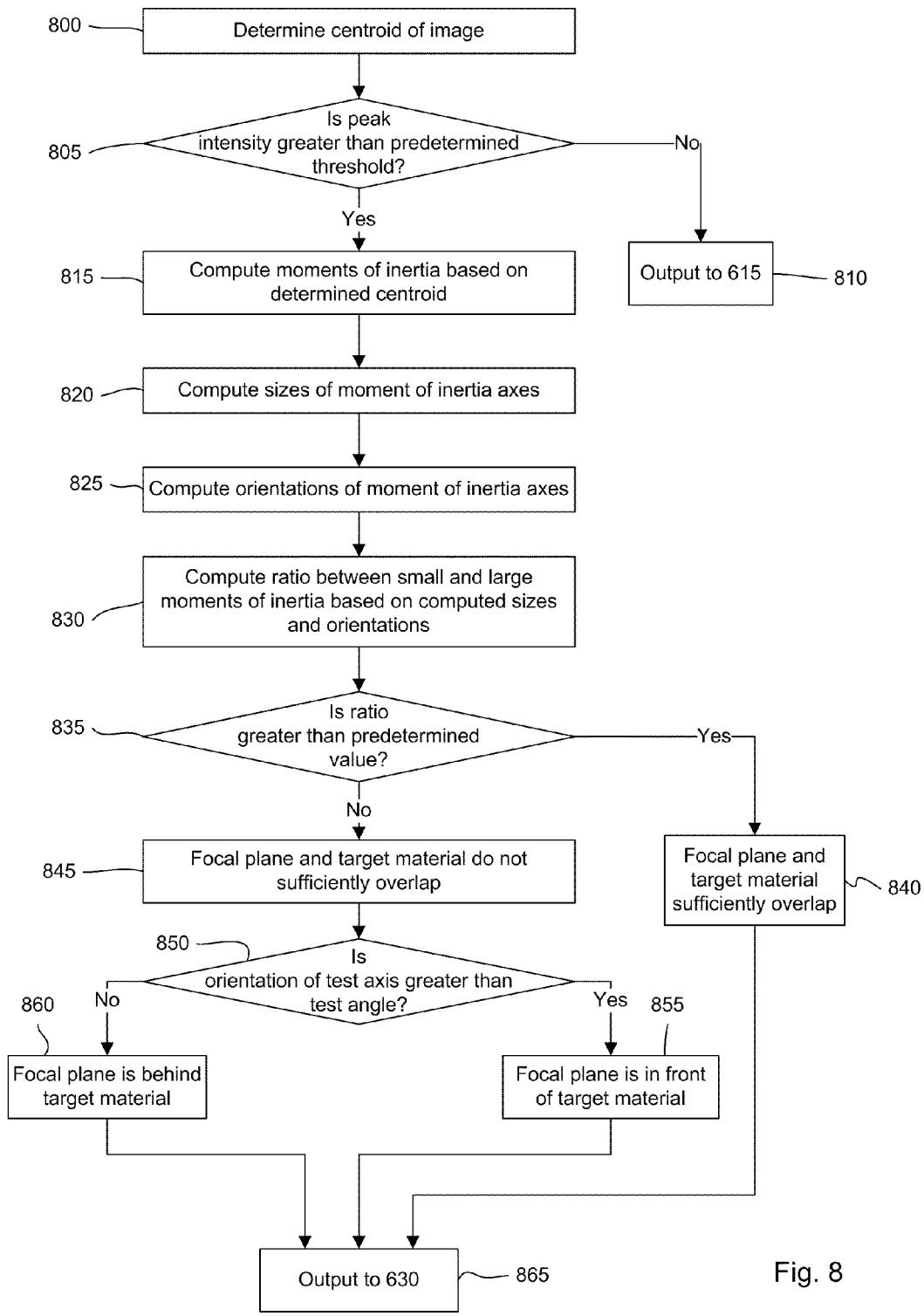
FIG. 8 is a flow chart of a procedure performed by a controller of the alignment system of FIG. 1 or 2.

Referring also to FIG. 8, the controller 125, 325 performs an exemplary procedure 625 for analyzing the output of the detection system 115, 315 to produce information about the relative position between the focal region 735 and the target material 740. Initially, the controller 125, 325 computes a centroid of the image (for example, the image 717) (step 800). This computation can involve removing background noise from the raw image data, computing the image energy along each axis of the image and dividing that image energy by total image energy to estimate a centroid, and centering the image around the estimated centroid. Next, the controller 125, 325 determines if peak intensity is greater than a threshold (for example, a background) value (step 805) to support moving forward with further analysis. If the peak intensity is not greater than the threshold value, then the controller 125, 325 exits the procedure 625, after which steady-state operation 520 resumes at step 615 (the laser beam 760 is detected at the detection system 715) (step 810).

If the peak intensity is greater than the threshold value, then the controller 125, 325 computes the moments of inertia of each axis in the array based on the determined centroid (step 815), computes sizes of the moments of inertia axes (step 820), and computes orientations of the moments of inertia axes (step 825).

Figure 9:
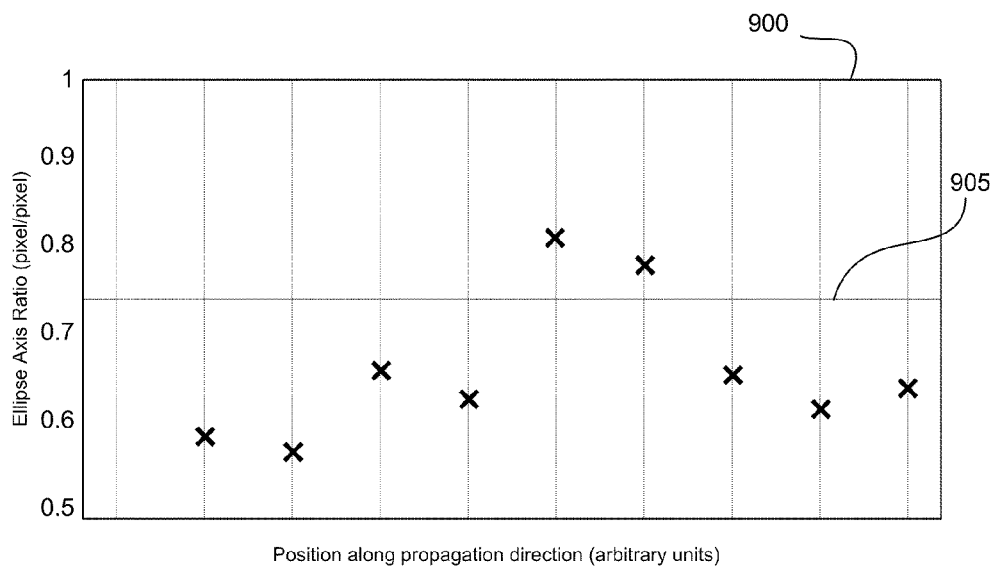
FIG. 9 is a graph of a ratio of between small and large moments of inertia of an image of a laser beam reflected from a target material within the chamber versus position of a focal plane of an amplified light beam along a propagation direction of the amplified light beam.

The controller 125, 325 then computes a ratio between small and large moments of inertia based on the sizes and orientations computed in steps 820 and 825 (step 830). The controller 125, 325 determines whether the computed ratio is greater than a predetermined threshold value (such as, for example, 0.80) (step 835). Referring also to FIG. 9, a graph 900 shows the exemplary computed ratio at distinct positions of the focal plane along the optical axis. In graph 900, the line 905 indicates the predetermined threshold value.

If the ratio is greater than the predetermined threshold value (step 835), then the controller 125, 325 determines that the focal plane 750 and the target material 740 sufficiently overlap along the optical axis (step 840), as is the case in the optical diagram shown in FIG. 7B. This is a reasonable determination because if the ratio is greater than a predetermined threshold, then the small moment of inertia is not much smaller than the large moment of inertia and the image would appear more circular, as shown in FIG. 7B.

If the ratio is not greater than the predetermined threshold value (step 835), then the controller 125, 325 determines that the focal plane 750 and the target material 740 do not sufficiently overlap (step 845), as is the case in the optical diagrams of FIGS. 7A and 7C. In this case, the small moment of inertia is significantly smaller than the large moment of inertia, which means the image would appear elliptical, as shown in FIG. 7A or 7C. Moreover, the controller 125, 325 also determines if the orientation of a test axis (which can be assigned to be the axis that is associated with the large moment of inertia as shown in FIGS. 7A and 7C) is greater than a predetermined angle (for example, 90°) relative to the horizontal axis (step 850).

Figure 10:
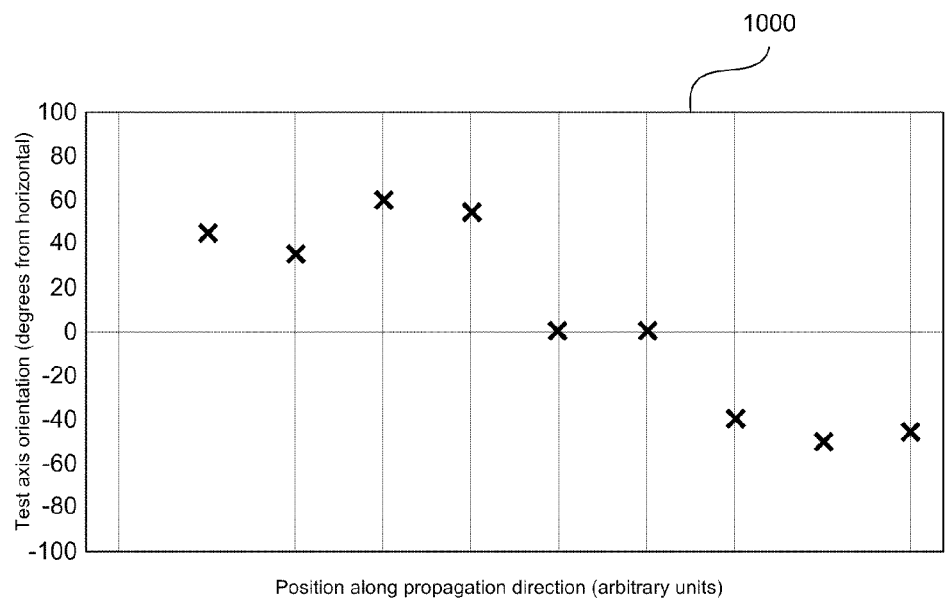
FIG. 10 is a graph of a test axis orientation versus position of the focal plane.

The orientation of the test axis can be the angle 765 of the test axis relative to the horizontal axis. And, the test axis orientation 765 is directly influenced by the orientation (in the plane perpendicular to the propagation direction) of the wavefront modification system 120, 320. As discussed above, the wavefront modification system 120, 320 modifies the wavefront of the reflected laser beam to create two slightly different focal planes for two directions that are transverse to the propagation direction. The orientation of these two transverse directions is what determines the test axis orientation 765 (and also the orientation of the axis that is perpendicular to the test axis). Thus, if the two transverse directions of the system 120, 320 are the horizontal and vertical directions transverse to the propagation direction, then the test axis orientation 765 should be along one of the horizontal or vertical directions (depending on how the test axis orientation 765 is defined). Referring to FIG. 10, which shows a graph 1000 of exemplary measurements taken of the test axis orientation 765 relative to the position of the focal plane, if the two transverse directions of the system 120, 320 are about 45° off of the horizontal and vertical directions transverse to the propagation direction, then the test axis orientation 765 is about 45° above the horizontal direction if the focal plane is behind of the target material (as shown in FIG. 7A) and is about 45° below the horizontal direction if the focal plane is in front of the target material (as shown in FIG. 7C). For the purposes of performing the calculations, the predetermined angle is set to be between the text axis orientation 765 and the orientation of the axis that is perpendicular to the text axis.

If the controller 125, 325 determines that the test axis orientation 765 is greater than the predetermined angle (for example, 90°) (step 850), then the controller 125, 325 determines that the focal plane is in front of the target material, as shown in FIG. 7C (step 855). If the controller 125, 325 determines that the test axis orientation 765 is not greater than the predetermined angle (for example, 90°) (step 850), then the controller 125, 325 determines that the focal plane is behind the target material, as shown in FIG. 7A (step 860). The controller 125, 325 then outputs the determinations made at steps 840, 860, 865 to ascertain whether the focal waist overlaps the target material (step 630).

Referring to FIG. 11, another implementation of an exemplary extreme ultraviolet light system 1100 includes a light source 1105, a steering system 1110, a detection system 1115, a wavefront modification system 1120, and a controller 1125. For simplicity, only features in the light system 100 of FIG. 1 that are not in the light system 1100 are described in more detail below. The light system 1100 includes, in addition to elements that were shown in the system 100, a guide laser 1175 that can be used to align components of the steering system 1110 or to assist in steering the amplified light beam 1130 to the target location. The guide laser 1175 produces a guide laser beam 1180 having a guide wavelength that is within the wavelength range of the optical components within the steering system 1110, As mentioned above, the guide wavelength can be distinct from the operating wavelength of the light source 1105 (and therefore the wavelength of the amplified light beam 1130). The guide laser beam 1180 is directed into the path of the amplified light beam 1130 through a partially transmissive mirror 1185 (for example, a beam splitter). Moreover, the guide laser beam of the guide laser 1175 should have enough power to pass through the optical components that need to be aligned yet have a relatively lower power than the amplified light beam 1130.

The guide laser 1175 can operate even while the light source 1105 is not producing the amplified light beam 1130. The guide laser 1175 can be used to align components within the light source 1105, for example, during initial set up of the light source 1105 and prior to EUV production in the chamber 1145. Additionally, in this implementation, the guide laser 1175 can also be used to align components within the steering system 1110 to steer the amplified light beam 1130 to the target location. In other implementations, the guide laser 1175 can be used to align the optical components within the steering system 1110 and to steer the amplified light beam 1130 toward the target location while the gain media of the light source 1105 is inverted but not during production of coherent laser oscillation or during EUV production in the chamber 1145 in which case, there is a laser cavity and the laser system is producing coherent laser oscillation.

If a guide laser 1175 is used, then the alignment system can use, as the reflected laser beam 1160, the guide laser light that is reflected from the target material 1140 while the light source 1105 is not producing the amplified light beam 1130 (for example, between pulses). In this way, the alignment system can operate even when the light source 1105 is not producing the amplified light beam 1130 and therefore also when the light system 1100 does not produce EUV light in the chamber 1145.

Figure 12:
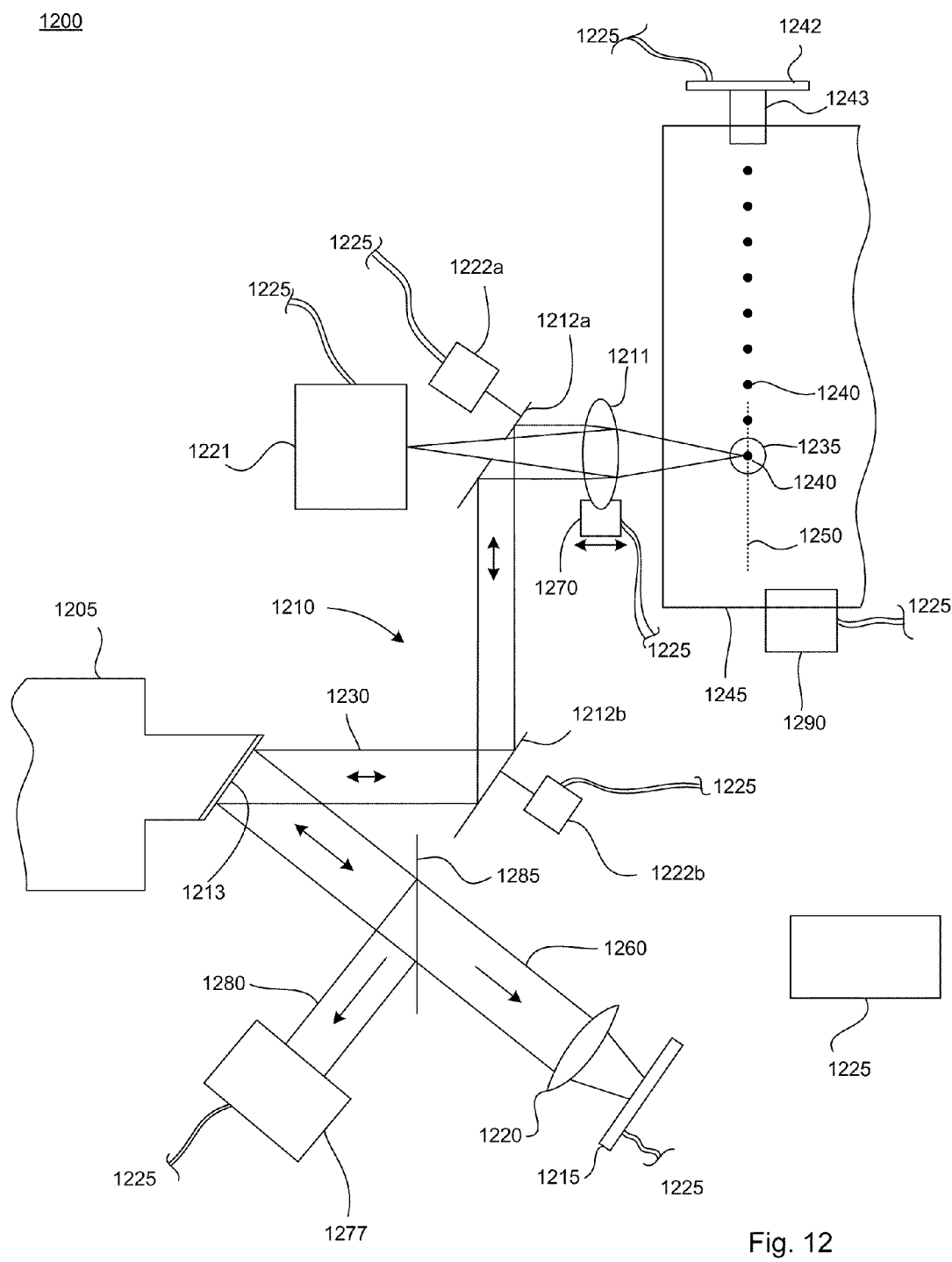
FIG. 12 is a block diagram of an exemplary implementation of the alignment system of FIG. 1.

Referring also to FIG. 12, another implementation of an exemplary extreme ultraviolet light system 1200 includes a light source 1205, a steering system 1210, a detection system 1215, a wavefront modification system 1220, and a controller 1225. For simplicity, only features in the light system 100 of FIG. 1 that are not in the light system 1200 are described below. The light system 1200 includes, in addition to elements that were shown in the system 100, a light monitor 1277 that can measure other features of the laser beam 1260 reflected from the target material 1240.

Figure 13A:
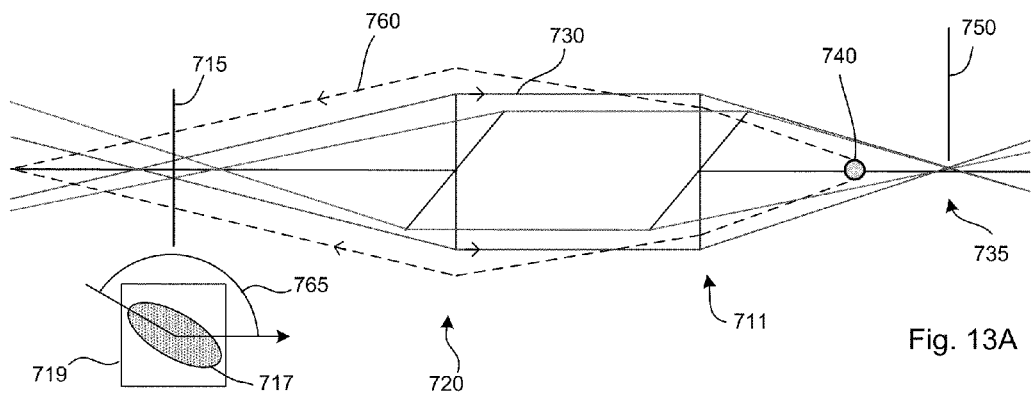
FIGS. 13A-13C are optical diagrams depicting an amplified light beam traveling through the alignment system of FIG. 1 or 3.
Figure 13B:
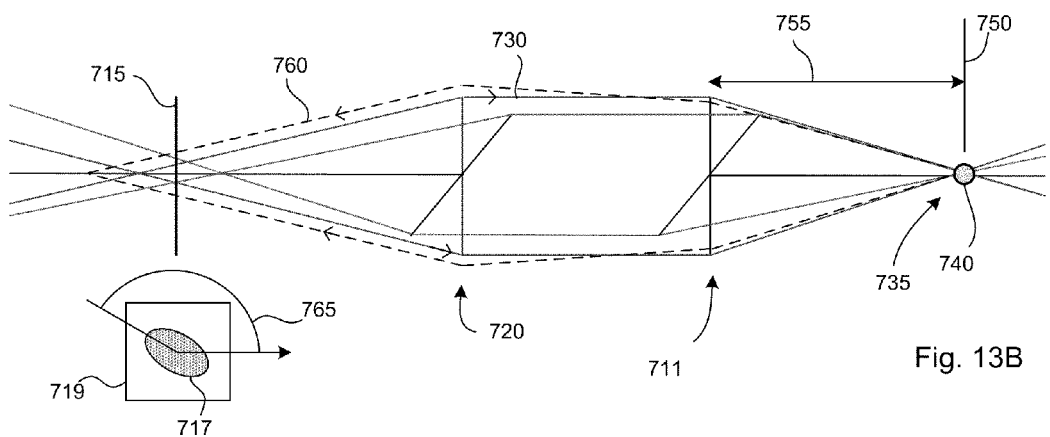

In the implementation shown in FIGS. 7A-C, the image intensity profile is generally circular in shape when the target material 740 overlaps the focal plane 750. However, it is alternatively possible that the image intensity profile at the detection system 715 is elliptical when the target material 740 overlaps the focal plane 750, as shown in FIG. 13B. The image intensity profile at which there is suitable overlap is determined empirically by adjusting features of the steering system and/or the target material delivery system to obtain, for example, the maximum EUV power (or some other suitable metric); therefore, it is possible that this empirical determination leads to the realization that the maximum EUV power corresponds to a non-symmetrical (or an elliptical) image intensity profile.

Figure 13C:
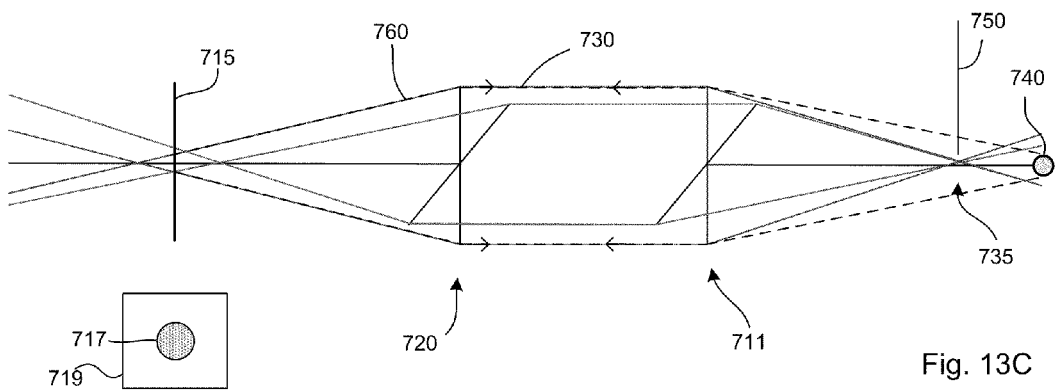

In such a situation, the controller assumes that this elliptical shape (for example, the shape shown in FIG. 13B) is the shape at which the target material 740 suitably overlaps the focal plane 750. Thus, during operation, the controller determines that the focal plane 750 and the target material 740 sufficiently overlap if the ratio is between a predetermined maximum value and a predetermined minimum value and the test axis orientation (the angle 765) is less than the predetermined angle (as shown in FIG. 13B). Moreover, the controller may also determine that the focal plane 750 is in front of the target material 740 if the ratio is less than the predetermined minimum threshold value and the test axis orientation (the angle 765) is less than the predetermined angle (as shown in FIG. 13A) and that the focal plane 750 overlaps the target material 740 if the ratio is greater than the predetermined maximum threshold value (as shown in FIG. 13C).

As discussed in the implementation described in FIG. 6 above, the controller separately analyzes and controls each axis (the optical axis in steps 640 and 645 and the plane perpendicular to the optical axis in steps 630 and 635) when determining whether the focal region 135 overlaps the target material. In other implementations, the controller determines, using a multi-variable procedure, whether the focal region 135 (both the focal waist radius and the focal plane) overlaps the target material without having to perform the separate steps (steps 630, 635 and steps 640, 645) for the focal waist radius and the focal plane. In this way, the controller analyzes and controls both axes simultaneously.

Other implementations are within the scope of the following claims.

What is claimed is:

1. An extreme ultraviolet light system comprising:
a light source that produces an amplified light beam traveling along a propagation direction;
a steering system that steers and focuses the amplified light beam to a focal plane near a target location;
a target material delivery system that supplies a target material at the target location, an interaction between the target material and the focused amplified light beam consuming and converting the target material to a plasma that emits extreme ultraviolet radiation and producing a reflection of the amplified light beam;
an extreme ultraviolet light chamber including an extreme ultraviolet light collector and the target material at the target location, the extreme ultraviolet light collector in the path of the extreme ultraviolet light that is produced when the target material is irradiated by the amplified light beam;
a detection system including at least one detector positioned to detect an image of the amplified light beam that is reflected from at least a portion of the target material;
a wavefront modification system in the path of the reflected amplified light beam and between the target location and the detection system and configured to modify the wavefront of the reflected amplified light beam as a function of a target focal plane position along the propagation direction; and
a controller coupled to the detection system and to the steering system, the controller including logic for adjusting a location of the focal plane of the amplified light beam relative to the target material along the propagation direction based on the detected image of the reflected amplified light beam.

2. The system of claim 1, wherein the wavefront modification system includes a transmissive optical element.

3. The system of claim 2, wherein the transmissive optical element is an astigmatic lens.

4. The system of claim 2, wherein the transmissive optical element is a cylindrical lens.

5. The system of claim 1, wherein the wavefront modification system includes a reflective optical element.

6. The system of claim 5, wherein the reflective optical element includes a cylindrical mirror or a saddle-shaped mirror.

7. The system of claim 1, wherein a size and an orientation of the detected image of the reflected amplified light beam varies with the target focal plane position relative to the target location.

8. The system of claim 1, wherein the wavefront modification system is between an output window of the light source and the detection system.

9. The system of claim 1, wherein the wavefront modification system is between the target location and an output window of the light source.

10. The system of claim 1, wherein the target focal plane is the focal plane of the amplified light beam.

11. The system of claim 10, further comprising a guide laser producing a guide laser beam aligned with the amplified light beam, wherein the guide laser beam operates at a wavelength that is distinct from a wavelength of the amplified light beam.

12. The system of claim 1, wherein the light source includes at least a power amplifier.

13. The system of claim 1, wherein the light source includes at least a master oscillator.

14. A method of generating an extreme ultraviolet light comprising:
irradiating a target material with an amplified light beam traveling along a propagation direction at a focal plane of the amplified light beam, an interaction between the target material and the focused amplified light beam consuming and converting the target material to a plasma that emits extreme ultraviolet radiation and producing a reflection of the amplified light beam;

modifying a wavefront of the amplified light beam that is reflected from the target material, wherein the modification is a function of a position of a target focal plane along the propagation direction;

detecting an image of the modified reflected amplified light beam;

determining a location of the focal plane of the amplified light beam based on the detected image;

adjusting the position of the focal plane relative to the target material if the determined focal plane location does not overlap a target location; and irradiating the target material with the amplified light beam having the adjusted focal plane position.

15. The method of claim 14, wherein irradiating the target material with the amplified light beam includes operating a light source to generate pulses of the amplified light beam.

16. The method of claim 15, wherein modifying the wavefront of the reflected amplified light beam includes modifying the wavefront only while the pulses are generated.

17. The method of claim 14, wherein modifying the wavefront includes introducing a separation along the propagation direction between focal planes each having a focus in a respective transverse direction relative to the propagation direction.

18. The method of claim 14, wherein modifying the wavefront includes modifying one or more of a curvature and a shape of a wavefront of the reflected laser beam.

19. The method of claim 14, wherein modifying the wavefront includes introducing an astigmatism in the wavefront of the reflected laser beam.

20. The method of claim 14, wherein determining the location of the focal plane includes fitting the detected image to a metric and determining a center of image intensity and an orientation of the detected image based on the metric.

21. The method of claim 20, wherein determining the location of the focal plane includes comparing the determined center of image intensity and the orientation to a predetermined set of centers of image intensity and orientations.

22. The method of claim 20, wherein determining the location of the focal plane includes:

ascertaining whether a ratio between small and large moments of inertia of the image intensity is greater than a predetermined value; and ascertaining whether the orientation of the detected image is greater than a predetermined angle.

23. The method of claim 14, wherein determining the location of the focal plane includes fitting the detected image to the metric and determining an ellipticity based on the metric.

24. The method of claim 23, wherein determining the location of the focal plane includes comparing characteristics of the determined ellipticity to a set of predetermined values.

25. The system of claim 1, wherein the reflected amplified light beam propagates in a direction that is opposite to a direction of propagation of the amplified light beam.

26. The system of claim 1, wherein the collector is in the path of the reflected amplified light beam.

27. The system of claim 1, wherein the amplified light beam propagates through an opening defined by the collector mirror, and the reflected amplified light beam propagates through the opening defined by the collector mirror in a direction that is opposite to the direction of propagation of the amplified light beam.

28. The system of claim 1, wherein the reflected amplified light beam exits the extreme ultraviolet light chamber and is subsequently detected by the detection system.

29. The method of claim 14, further comprising:

passing the amplified light beam through an opening defined by a collector mirror; and passing the reflected amplified beam through the opening defined by the collector mirror prior to modifying the wavefront of the amplified light beam.

* * * * *